Patented Nov. 14, 1950

2,529,885

UNITED STATES PATENT OFFICE 2,529,885

DELAYED ACTION COAGULANT

Daniel S. Sears, Cuyahoga Falls, Ohio, assignor to The B. F. Goodrich Company, New York, N. Y., a corporation of New York No Drawing. Application April 2, 1947, Serial No. 738,947

20 Claims. (Cl. 260—85.1)

This invention relates to the coagulation of a latex and a coagulant composition therefor and is particularly concerned with delayed coagulation of an aqueous dispersion of natural or synthetic rubber by the admixture therewith of a delayed action coagulant composition.

Latex is ordinarily coagulated by means of an instantaneous coagulant such as a water-soluble acid or a water-soluble polyvalent metal salt. In many instances, however, it is desirable to disperse the coagulant for the latex in the latex dispersion without effecting immediate coagulation. For this purpose a so-called delayed action coagulant is necessary which undergoes a measurable induction period before effecting coagulation. Delayed action coagulation is particularly desirable in the manufacture of "foamed" sponge rubber articles wherein the rubber latex is brought into a semi-stable foamed condition by whipping air into the latex or by incorporating a gas-forming material in the latex. This semi-stable foam is then coagulated, before the foam collapses, to give a cellular product. Instantaneous coagulants obviously cannot be incorporated into the latex before foaming; and if sprayed on the semi-stable foam, they must effect coagulation by slow diffusion through the foam which does not yield a uniform product.

It is desirable, therefore, to provide a coagulant composition which can be thoroughly mixed with a latex without effecting coagulation of the latex and which thereafter completely coagulates the latex after the lapse of a measurable time interval. In addition, the coagulant composition must be capable of being mixed into a foamed latex without causing the foam to collapse.

I have discovered that delayed action coagulation of a latex may be effected by dispersing in the latex a water-soluble peroxide and an alkali metal salt of an alkyl aldehyde sulfoxylate.

In practising this invention, an alkali metal salt of an alkyl aldehyde sulfoxylate is thoroughly mixed with a stabilized basic latex dispersion. The sulfoxylate is preferably added as an aqueous solution although the solid compound may be added to the latex. The addition of the sulfoxylate does not coagulate the latex nor does it cause the latex foam to collapse. A water-soluble peroxide, preferably hydrogen peroxide, is then also mixed into the latex with coagulation of the latex being effected after the lapse of a measurable time interval. For example, sodium formaldehyde sulfoxylate and hydrogen peroxide may be thoroughly mixed into a stabilized natural rubber latex without effecting immediate coagulation. After a lapse of 3 to 5 minutes, however, the latex will be completely coagulated with the coagulation being rapidly effected after an initial induction period during which time the latex remains substantially uncoagulated. The order of mixing may be varied; thus, the peroxide may be added before the sulfoxylate or they may be added simultaneously.

Any alkali metal salt of an alkyl aldehyde sulfoxylate may be used in practising this invention, as for example the sodium or potassium salts of formaldehyde sulfoxylate, acetaldehyde sulfoxylate, butyraldehyde sulfoxylate and similar alkyl aldehyde sulfoxylates.

Hydrogen peroxide is preferably used in conjunction with the sulfoxylates because of the relative stability of the aqueous solution thereof but any suitable water-soluble peroxide may be used as for example sodium peroxide, potassium peroxide, and strontium peroxide.

The coagulant composition herein described may be used to coagulate any rubber latex whether a natural or synthetic rubber latex or may be used to coagulate other latices containing polymeric organic compounds such as vinyl resin latices, etc. The latex is preferably stabilized against salt flocculation by the addition of a suitable protective colloid such as methyl cellulose, gelatin or similar stabilizing agent and may also contain the commonly employed compounding ingredients for latex such as fillers, reinforcing pigments, vulcanization agents and accelerators therefor, emulsifying agents, etc.

The sulfoxylate is preferably added to the latex as a concentrated aqueous solution and is preferably used in an amount equal to from 0.1% to 10% by weight of the rubber content of the latex to be coagulated although greater or lesser amounts may be used depending upon the pH of the latex dispersion and the particular latex composition to be coagulated.

The peroxide is preferably added as an aqueous solution and the commercially available 30% hydrogen peroxide solution is particularly suitable. The peroxide is preferably used in an amount of from ½ to equal the weight of the sulfoxylate although as low as 25% the weight of the sulfoxylate or lower may be used or an excess of the peroxide up to 2 to 3 times the weight of sulfoxylate or higher may be used.

A typical example of the use of a coagulant composition embodying this invention will be included for purposes of illustration but it will be understood that the example is not intended to limit the scope of the invention.

Example 50 gm. butadiene-styrene latex (75:25 copolymer —55% T. S.)
5 cc. methyl cellulose solution
2 cc. 50% zinc oxide dispersion
2 cc. triethanolamine laurate solution
2 cc. 50% sodium formaldehyde sulfoxylate solution
1.5 cc. 30% hydrogen peroxide solution All of the above solutions and dispersions are in aqueous media. The latex, methyl cellulose, and zinc oxide are thoroughly mixed and the sulfoxylate dispersed therein. The hydrogen peroxide is then stirred into the latex. Complete coagulation of the latex is effected in 5 minutes after the addition of the peroxide. Similar results are obtained using other sulfoxylates of the character described, other water-soluble peroxides and other latex compositions.

It will be understood that various materials may be used and the relative proportions may be varied within the spirit and scope of the invention as defined in the appended claims.

I claim:

1. A delayed action coagulant for an aqueous dispersion of a rubber material comprising an alkali metal salt of an alkyl aldehyde sulfoxylate and hydrogen peroxide in an amount of ¼ to 3 times the weight of said sulfoxylate.

2. A delayed action coagulant for an acid-coagulable aqueous dispersion of rubber material comprising the sodium salt of an alkyl aldehyde sulfoxylate and hydrogen peroxide in an amount of ¼ to 3 times the weight of said sulfoxylate.

3. A delayed action coagulant for an acid-coagulable rubber latex comprising an alkali metal salt of formaldehyde sulfoxylate and hydrogen peroxide in an amount of ¼ to 3 times the weight of said sulfoxylate.

4. A delayed action coagulant for an acid-coagulable aqueous dispersion of rubber material comprising one part by weight of sodium formaldehyde sulfoxylate and ¼ to 3 parts by weight of hydrogen peroxide.

5. The method of coagulating an acid-coagulable aqueous dispersion of polymeric organic material which comprises dispersing therein 0.1–10% by weight of an alkali metal salt of an alkyl aldehyde sulfoxylate and 0.025–30.0% by weight of hydrogen peroxide based on the weight of polymeric organic material in said dispersion.

6. The method of coagulating an acid-coagulable aqueous dispersion of rubber material which comprises dispersing therein 0.1–10% by weight of the sodium salt of an alkyl aldehyde sulfoxylate based on the weight of rubber material in said dispersion and hydrogen peroxide in an amount equal to ¼ to 3 times the weight of said sulfoxylate.

7. The method of coagulating an acid-coagulable rubber latex which comprises dispersing therein 0.1–10% by weight of an alkali metal salt of formaldehyde sulfoxylate and hydrogen peroxide in an amount equal to ¼ to 3 times the weight of said sulfoxylate.

8. The method of coagulating an acid-coagulable rubber latex which comprises dispersing therein 0.1–10% by weight of sodium formaldehyde sulfoxylate and hydrogen peroxide in an amount of ¼ to 3 times the weight of said sulfoxylate.

9. In combination with an acid-coagulable aqueous dispersion of polymeric organic material, 0.1–10% by weight of an alkali metal salt of an alkyl aldehyde sulfoxylate based on the weight of polymeric organic material in said dispersion, and hydrogen peroxide in an amount of from ¼ to 3 times the weight of said sulfoxylate.

10. In combination with an acid-coagulable rubber latex, 0.1–10% by weight of sodium formaldehyde sulfoxylate based on the weight of rubber in said latex and hydrogen peroxide in an amount of from ¼ to 3 times the weight of said sulfoxylate.

11. The composition of claim 1 in which the weight of said peroxide is substantially equal to the weight of said sulfoxylate.

12. The composition of claim 2 in which the weight of said peroxide is substantially equal to the weight of said sulfoxylate.

13. The composition of claim 3 in which the weight of said peroxide is substantially equal to the weight of said sulfoxylate.

14. The composition of claim 4 in which the weight of said peroxide is substantially equal to the weight of said sulfoxylate.

15. The method of claim 5 in which the weight of said peroxide is substantially equal to the weight of said sulfoxylate.

16. The method of claim 6 in which the weight of said peroxide is substantially equal to the weight of said sulfoxylate.

17. The method of claim 7 in which the weight of said peroxide is substantially equal to the weight of said sulfoxylate.

18. The method of claim 8 in which the weight of said peroxide is substantially equal to the weight of said sulfoxylate.

19. The method of coagulating an aqueous dispersion of a rubbery butadiene-styrene copolymer, which method comprises dispersing therein 0.1 to 10% by weight of an alkali metal salt of an alkyl aldehyde sulfoxylate and 0.025 to 30% by weight of hydrogen peroxide based on the weight of rubbery copolymer in said dispersion.

20. In combination with an aqueous dispersion of a rubbery butadiene-styrene copolymer, 0.1 to 10% by weight of sodium formaldehyde sulfoxylate based on the weight of rubbery copolymer in said dispersion and hydrogen peroxide in an amount of from ¼ to 3 times the weight of said sulfoxylate.

DANIEL S. SEARS.

REFERENCES CITED

The following references are of record in the file of this patent:

UNITED STATES PATENTS

| Number | Name | Date |
| --- | --- | --- |
| 1,870,788 | Twin et al. | Aug. 9, 1932 |
| 1,981,184 | McGavach | Nov. 20, 1934 |
| 2,138,081 | Wolf | Nov. 29, 1938 |
| 2,206,448 | Busse et al. | July 2, 1940 |
| 2,350,294 | Stewart | May 30, 1944 |

FOREIGN PATENTS

| Number | Country | Date |
| --- | --- | --- |
| 23,723 | Great Britain | of 1911 |
| 256,904 | Germany | Feb. 22, 1913 |

OTHER REFERENCES

Transactions, Faraday Society, vol. 32, 1936 (pages 1570–1576).